US012668148B2

(12) United States Patent
Devaragudi et al.

(10) Patent No.: US 12,668,148 B2
(45) Date of Patent: Jun. 30, 2026

(54) ELECTRIC VEHICLE ENERGY STORAGE PRECONDITIONING FOR FAST CHARGING

(71) Applicant: Atieva, Inc., Newark, CA (US)

(72) Inventors: Sai Rajeev Devaragudi, Newark, CA (US); Hareesh Parepalli, Newark, CA (US); Gowtham Rajavelu, Newark, CA (US)

(73) Assignee: Atieva, Inc., Newark, CA (US)

( * ) Notice: Subject to any disclaimer, the term of this patent is extended or adjusted under 35 U.S.C. 154(b) by 64 days.

(21) Appl. No.: 18/650,855

(22) Filed: Apr. 30, 2024

(65) Prior Publication Data

US 2025/0332942 A1     Oct. 30, 2025

(51) Int. Cl.
*B60H 1/00*     (2006.01)
*B60L 50/51*     (2019.01)
*B60L 50/52*     (2019.01)
*B60L 53/62*     (2019.01)
*B60L 53/63*     (2019.01)

(52) U.S. Cl.
CPC .............. *B60L 53/62* (2019.02); *B60L 53/63* (2019.02); *B60L 2240/545* (2013.01)

(58) Field of Classification Search
CPC ..... B60L 53/62; B60L 53/63; B60L 2240/545

USPC ........ 320/109, 104, 137, 134; 307/9.1, 10.1; 340/455; 701/22, 1, 23
See application file for complete search history.

(56)     References Cited

U.S. PATENT DOCUMENTS

| | | | |
|---|---|---|---|
| 2018/0141458 A1* | 5/2018 | Jammoul .............. | H01M 10/63 |
| 2022/0063440 A1 | 3/2022 | Goldman-Shenhar et al. | |
| 2022/0185135 A1* | 6/2022 | Langton .................. | B60L 58/12 |
| 2023/0150385 A1* | 5/2023 | Chung .................... | B60L 58/12 |
| | | | 429/62 |
| 2023/0382256 A1* | 11/2023 | Tuukkanen ........... | H02J 7/0048 |

OTHER PUBLICATIONS

International Search Report and Written Opinion received for PCT App. No. PCT/US2025/024572, mailed on Jun. 5, 2025, 19 pages.

* cited by examiner

*Primary Examiner* — Elim Ortiz
(74) *Attorney, Agent, or Firm* — Womble Bond Dickinson (US) LLP

(57)     ABSTRACT

In some embodiments, an electric vehicle (EV) includes an energy storage, a navigation system, and a vehicle management system configured to receive, from the navigation system, parameters associated with preconditioning the energy storage for charging, precondition, while travelling to a destination charger and based on the parameters, the energy storage to a target temperature, and charge the energy storage to a target state of energy using the destination charger.

30 Claims, 6 Drawing Sheets

Charger Connector Type 202

EVSE Type (AC/DC) 204

Charger Max. Power 206

Charger Availability 208

Charger Details 212

Time to Destination Charger 210

Distance to Destination Charger 211

SOE upon Arrival 213

Weather at Destination 216

End SOE 218

Altitude at Destination Charger 220

Destination Details 214

Onboard Navigation System 430

200

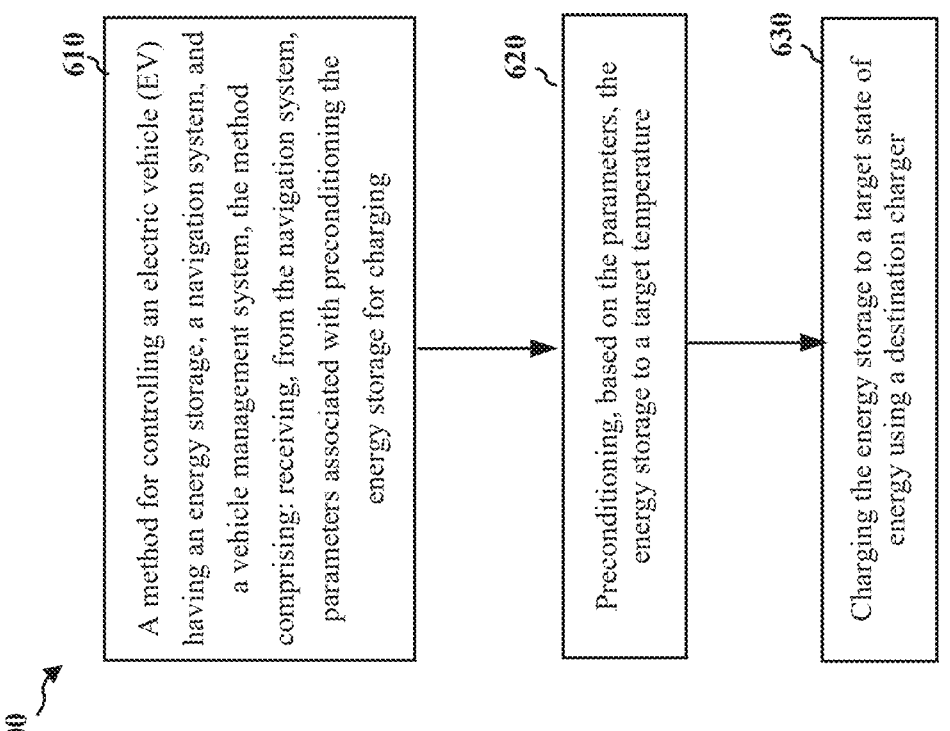

600

610

A method for controlling an electric vehicle (EV) having an energy storage, a navigation system, and a vehicle management system, the method comprising: receiving, from the navigation system, parameters associated with preconditioning the energy storage for charging

620

Preconditioning, based on the parameters, the energy storage to a target temperature

630

Charging the energy storage to a target state of energy using a destination charger

FIG. 6

ELECTRIC VEHICLE ENERGY STORAGE PRECONDITIONING FOR FAST CHARGING

FIELD

Embodiments disclosed herein relate generally to automobiles, and more particularly, to electric vehicle (EV) energy storage preconditioning for fast charging.

BACKGROUND

Electric vehicles (EVs) offer a promising alternative to traditional combustion engine vehicles, and often integrate smart technology and safety features into their designs. In some aspects, energy storage (e.g., a battery) in the EV requires charging (e.g., re-charging). In some aspects, the energy storage needs to be charged while the EV is traveling due to energy consumed by the EV motor. However, extended charging times can result in an inconvenience for the EV driver.

SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

One of the main barriers to widespread adoption of EVs is the time it takes to charge the energy storage (e.g., batteries in the EV). A key factor that affects the charging speed is the temperature of the battery cells. The battery cells can accept more power and charge faster when they are within an optimal temperature range. Preconditioning the energy storage can bring the energy storage within the optimal temperature range for fast charging.

In some aspects, the EV can include an energy storage, a navigation system, and a vehicle management system. The vehicle management system can be configured to receive, from the navigation system, parameters associated with preconditioning the energy storage for charging. The vehicle management system can precondition the energy storage, based on the parameters, to a target temperature while the EV is travelling to a destination charger. The vehicle management system can charge the energy storage to a target state of energy using the destination charger.

Therefore, aspects of the present disclosure can reduce the inconvenience caused by extended charging times at a destination charger. Further, the reduced charging times can decrease EV traffic congestion at the destination charger.

BRIEF DESCRIPTION OF THE DRAWINGS

The appended drawings illustrate examples and are, therefore, exemplary embodiments and not considering to be limiting in scope.

FIG. 6 is a flowchart for a method of preconditioning energy storage in an EV.

DETAILED DESCRIPTION

In the following description, numerous specific details are set forth to provide thorough explanation of embodiments of the present invention. It will be apparent, however, to one skilled in the art, that embodiments of the present invention can be practiced without these specific details. In other instances, well-known components, structures, and techniques have not been shown in detail in order not to obscure the understanding of this description.

When it comes to convenience, reliability and performance, electric vehicles are fast approaching vehicles powered with conventional fuels. However, energy storage (e.g., battery) charging in cold temperatures faces challenges. Cold temperatures impact the electrochemical reactions within the energy storage and onboard battery management systems can limit the charging rate to avoid damage to the battery. Cold temperature in particular can considerably degrade the charging rate and extend the duration of charging, which potentially pose challenges in EV operation in cold regions. Therefore, where regional climate can vary, fast charger deployment for EVs requires careful consideration regarding the effects of regional temperature on fast battery charging.

Similarly, when an EV battery is exposed to excessive heat (e.g., EV generated and/or ambient heat), the rate at which chemical reactions take place inside the battery increase. This includes the unwanted chemical reactions resulting in a corresponding loss of battery life. When an EV is charged under high temperature conditions, the increased operating temperature of batteries above the optimal temperature accelerates the aging process and can lead to the degradation of batteries.

To overcome these deficiencies, apparatuses and methods for using on-board communication hardware and sensors on an EV to precondition an energy storage for fast charging are disclosed. In some embodiments, the energy storage can be preconditioned to within an optimal fast charging temperature range (e.g., between 20 degrees C. and 30 degrees C.).

Figure 1:
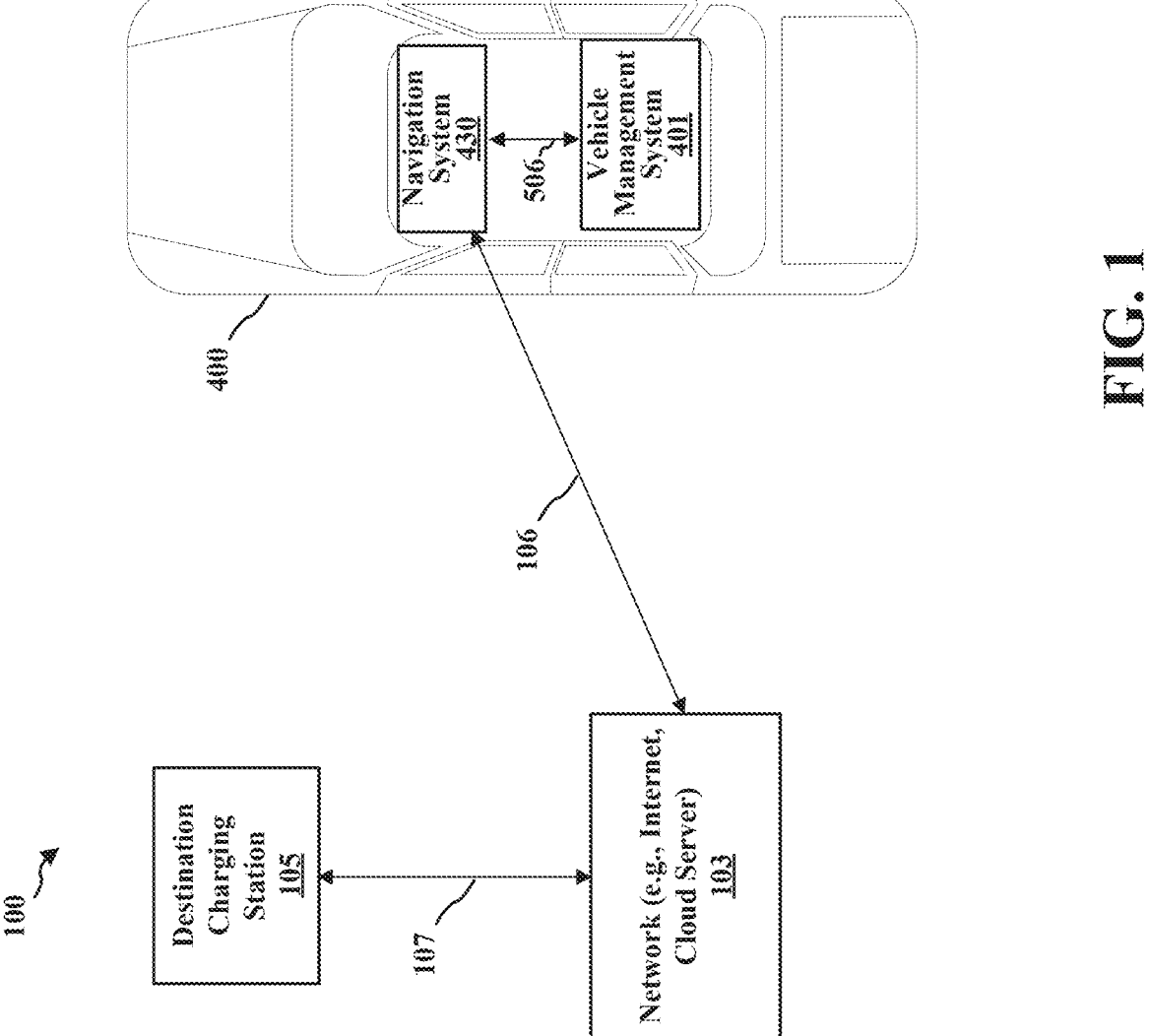
FIG. 1 illustrates some embodiments of a communication framework for use by an EV in communicating with cloud server.

FIG. 1 illustrates some embodiments of a communication framework 100 for a vehicle 400 to communicate with a network based cloud server 103. Referring to FIG. 1, a navigation system 430 of mobile vehicle (e.g., EV) 400 is communicably coupled to a network based cloud server 103 using communication link 106. Communication link 106 can be a wireless communication link (e.g., 4G, 5G, 6G wireless communication). In some embodiments, one or more charging stations 105 can be communicably coupled to the network based cloud server 103 using communication link 107. Communication link 107 can be a wired and/or wireless communication link.

In some aspects, charging station 105 can be part of a network of charging stations. The charging stations can be geographically distributed and available for charging EVs while they are traveling. In some aspects, the navigation system can receive parameters (e.g., data) associated with the charging station 105 via the cloud server 103. For example, the navigation system 430 can receive parameters associated with charging station 105 and other charging stations including location (e.g., latitude/longitude, street address, etc.), a charger connector type, an EV supply equipment (EVSE) type (e.g., AC/DC charging), a maximum power capability of the charger, an availability of the charger, and an ambient temperature at the charger location.

In some aspects, vehicle management system 401 can be configured to receive, from the navigation system 430, parameters associated with preconditioning the energy storage for charging. The vehicle management system 401 can precondition the energy storage to a target temperature while the EV is travelling to a destination charging station 105 (e.g., the destination charger). The vehicle management system 401 can precondition the energy storage based on the parameters received from the cloud server 103. The vehicle management system 401 can charge the energy storage to a target state of energy (e.g., an ending state of energy) using the charging station 105.

Figure 2:
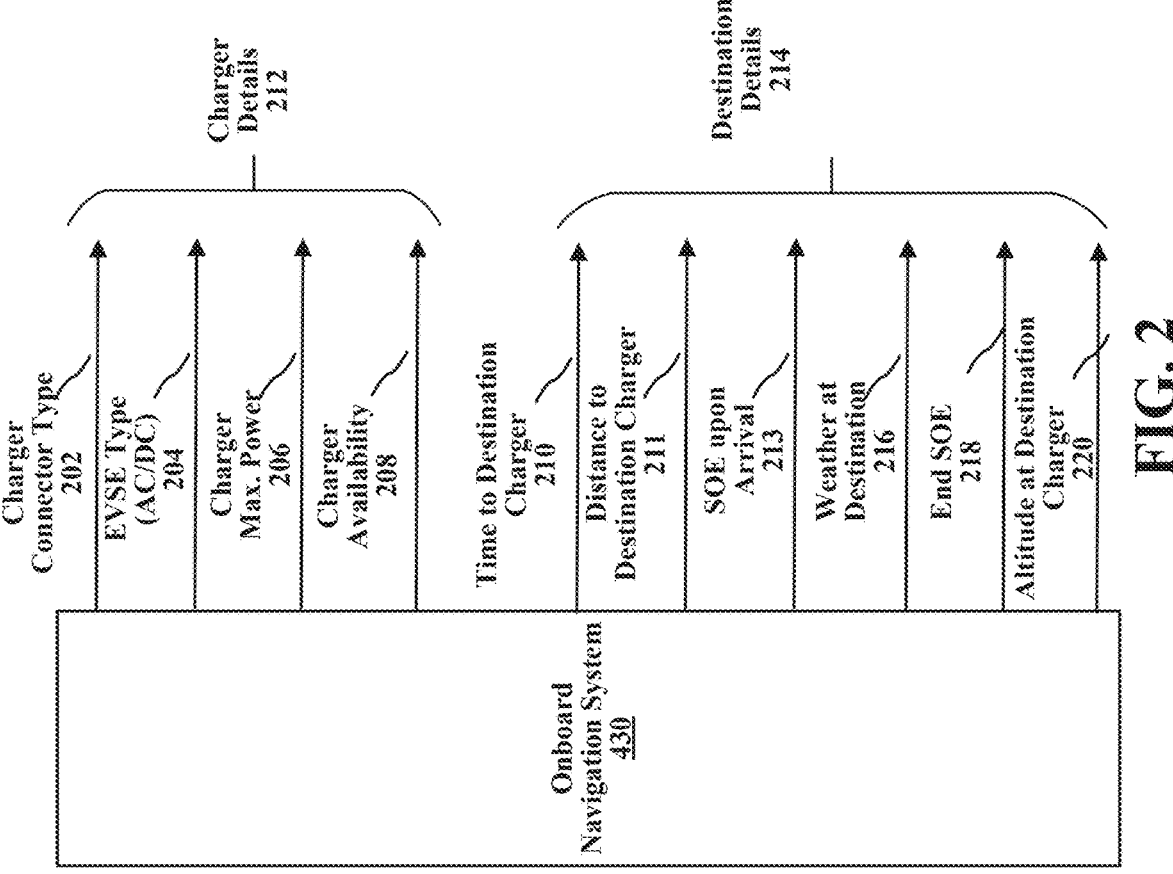
FIG. 2 is a block diagram indicating parameters of a navigation system associated with preconditioning energy storage in an EV.
Figure 2:

FIG. 2 is a block diagram 200 indicating parameters of a navigation system 430 associated with preconditioning energy storage in an EV. As described with reference to FIG. 1, onboard navigation system 430 can receive certain parameters related to preconditioning an energy storage in an EV. The onboard navigation system 430 can receive the parameters from a cloud server and/or retrieve the parameters from a database (e.g., map database) stored in memory of the EV. In some aspects, the parameters can be grouped into charger details 212 and destination details 214.

In some aspects, the charger details 212 can include a charger connector type 202. For example, the charger connector type can include a combined charging system (CCS) connector type (e.g., a standard charger connector type). CCS can use combo 1 (CCS1) or combo 2 (CCS2) connectors to provide power at up to 350 kilowatts (KW) (max 500 A) for fast charging. In some aspects, the charger connector type can include a North American charging standard (NACS) connector, a Guobiao/T (GB/T) connector, or a society of automotive engineers (SAE) J1772 connector (e.g., for AC charging). The J1772 5-pin standard supports a wide range of single-phase AC charging rates up to 19 kW.

In some aspects, the charger details 212 can include an EVSE type 204. For example, EVSE type 204 can indicate the type and magnitude of the charging voltage. For example, the EVSE voltage can include an AC voltage of 120, 208-240, or 480 volts. Additionally or alternatively, the EVSE voltage can include a DC voltage between 50 and 1000 volts. In some aspects, the vehicle management system 401 preconditions the energy storage based on the voltage. The vehicle management system 401 can precondition the energy storage to a lower temperature when the charger provides a lower voltage. For example, the energy storage temperature can be increased by 10 degrees C. rather than 20 degrees C. for a lower charging voltage.

In some aspects, the charger details 212 can include the charger maximum power 206. The charger maximum power 206 indicates the maximum power (e.g., 60 KW, 150 KW, 350 KW, etc.) the charger can provide to the energy storage of the EV.

In some aspects, the charger details 212 can include the charger availability 208. The charger availability 208 can indicate whether the charger is available to charge the energy storage or whether the charger is busy charging other vehicles. The charger availability 208 can indicate if the charger will be available when the EV is estimated to arrive at the charger destination. In some aspects, the charger availability 208 can indicate the amount of time the EV will need to wait at the charger destination before the charger is available. The vehicle management system 401 can precondition the energy storage based on when the charger will be available. For example, the vehicle management system 401 can heat or cool the energy storage at a rate such that the energy storage will be at the target temperature when the charger is available. In some aspects, the, the navigation system may indicate arrival at the destination charger, while the actual destination charger is located at a different location. For example, the navigation system may alert the driver that the vehicle has arrived at the destination charger location. However, due to inaccuracies in the navigation system (e.g., GPS drift, dead reckoning draft, navigation map errors, etc.) the destination charger may be located at a different location (e.g., across a parking lot, etc.). Despite the navigation system indicating the vehicle has arrived at the destination charger, the vehicle management system 401 can heat or cool the energy storage at a rate such that the energy storage will be at the target temperature when the vehicle is successfully connected to the destination charger.

In some aspects, the destination details 214 can include the time to destination charger 210. The time to destination charger 210 can indicate the amount of time the EV will travel to reach the destination charger 210. The time to destination charger 210 can be retrieved from a navigation service connected to the cloud server. The time to destination charger 210 can be based on the route traveled by the EV, the driving habits of the EV driver (e.g., speed, acceleration, etc.) and the traffic conditions along the travel route. In some aspects, the vehicle management system 401 can dynamically heat the energy storage based on the time to destination charger 210. For example, the vehicle management system 401 can control the motor to generate heat and direct that heat to the energy storage.

In some aspects, the destination details 214 can include the distance to destination charger 211. The distance to destination charger 211 can indicate a travel distance of the EV to reach the destination charger. The distance to destination charger 211 can be retrieved from a navigation service connected to the cloud server. The distance to destination charger 211 can be based on the route traveled by the EV.

In some aspects, the destination details 214 can include the state of energy (SOE) 213 of the energy storage upon arrival at the destination charger. The vehicle management system 401 can estimate the SOE upon arrival 213 based on the current SOE and the amount of energy consumed during travel to the destination charger.

In some aspects, the destination details 214 can include the weather at the destination charger 216. The weather at destination charger 216 can be retrieved from a service connected to the cloud server and indicate an ambient temperature at the destination charger. The vehicle management system 401 can precondition the energy storage based on the ambient temperature at the destination charger.

In some aspects, the destination details 214 can include the end SOE 218 after charging. The vehicle management system 401 can estimate the end SOE 218 based on an amount of energy required for the EV to reach its final destination. In some aspects, the energy storage does not need to be charged to 100% if a lower charging amount will allow the EV to reach the final destination. The vehicle management system 401 can estimate the end SOE 218 based on the arrival SOE 213 and an estimated amount of energy consumed during travel from the destination charger to the final destination. The vehicle management system 401 can precondition the energy storage based on the end SOE 218. For example, the vehicle management system 401 can precondition the energy storage to a lower temperature when a higher end SOE 218 is targeted as the charging process will self-heat the energy storage. In some aspects, the vehicle management system 401 can continue to condition the energy storage during the charging process to keep the temperature of the energy storage within an optimal range (e.g., approximately 20 to 30 degrees C.). For example, the vehicle management system 401 can manage issues such as charging failures and charging retries due to charging payment not being authorized or the charging connector incorrectly being plugged into the vehicle by the user. The vehicle management system 401 can continue to condition the energy storage and hold the preconditioning temperature until it confirms that a charge session has begun.

In some aspects, the destination details 214 can further include the altitude at destination charger 220, the distance to a next EV destination, the distance to the final destination, and/or the distance from the destination charger to the next destination charger. In some aspects, when the EV travels from the destination charger to the next destination charger, the vehicle management system 401 can precondition the energy storage to a lower temperature based on a post-charge thermal control optimization process that uses a lower energy consumption cooling process such as air flow convection cooling.

Figure 3:
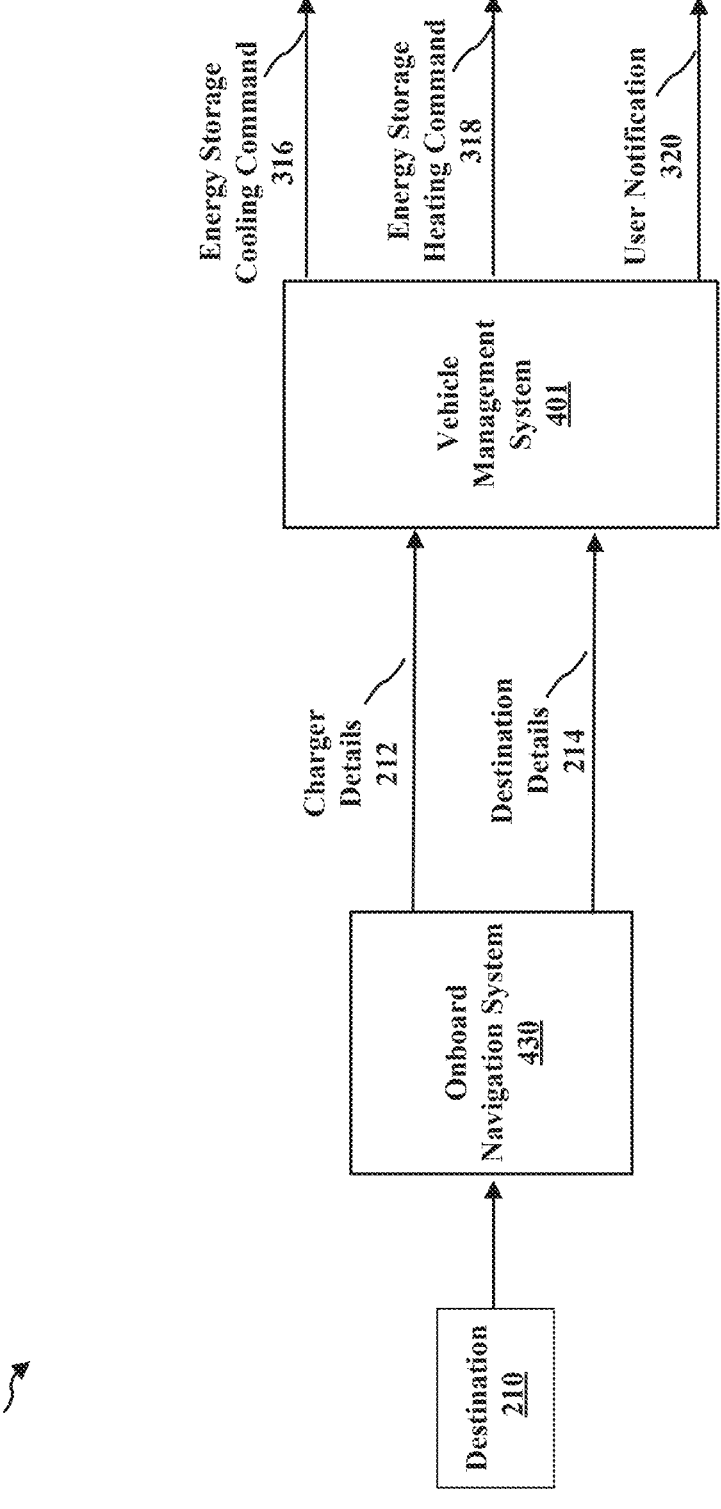
FIG. 3 is a block diagram indicating dataflow of a process for preconditioning energy storage in an EV.

FIG. 3 is a block diagram 300 indicating dataflow of a process for preconditioning energy storage in an EV. In some aspects, the onboard navigation system 430 will receive a destination 210 for the EV based on input from the EV driver. For example, referring to FIG. 4, the driver can input a destination for the EV to the navigation system 430 through the user interface 405. The navigation system 430 can provide preconditioning parameters including the charger details 212 and the destination details 214 to the vehicle management system 401. The charger details 212 and the destination details 214 are described with reference to FIG. 2. The navigation system 430 can provide the charger details 212 and the destination details 214 to the vehicle management system 401 using system bus 506.

In some aspects, the vehicle management system 401 preconditions the energy storage to a target temperature based on the parameters (e.g., charger details 212 and the destination details 214) using active and/or passive thermal conditioning. The vehicle management system 401 can precondition the energy storage while travelling to the destination charger. For example, the vehicle management system 401 can precondition the energy storage for a determined amount of time and/or distance before arrival at an available destination charger. In some aspects, the vehicle management system 401 can maintain the energy storage temperature for a certain distance if the driver travels away from the destination charger without charging the energy storage.

In some aspect, the target temperature can be a first temperature below (e.g., just below) a high temperature threshold. For example, the vehicle management system 401 can cool the energy storage until the temperature drops below the high temperature threshold.

In some aspect, the target temperature can be a second temperature above (e.g., just above) a low temperature threshold. For example, the vehicle management system 401 can heat the energy storage until the temperature rises above the low temperature threshold.

Additionally or alternative, the target temperature can be a third temperature in a middle range between the high temperature threshold and the low temperature threshold.

For example, the vehicle management system 401 can heat or cool the energy storage until the temperature reaches a middle range between the high temperature threshold and the low temperature threshold.

In some aspects, the vehicle management system 401 can determine that the energy storage requires an increase in temperature to bring it to the target temperature. The vehicle management system 401 can increase the energy storage temperature by increasing an amount of current (e.g., active thermal conditioning) provided to a motor of the EV. In this case, the increased current flow from the energy storage will increase the energy storage temperature (e.g., self heating). For example, the energy storage temperature can be increased by increasing the amount of current provided to a motor of the EV. The energy storage temperature increases by self-heating, but the main heat is coming from the motor which is diverted to the energy storage through the coolant fluids.

In some aspects, the vehicle management system 401 can increase the energy storage temperature by transferring heat from the motor to the energy storage (e.g., passive thermal conditioning) via a heat-transfer fluid (e.g., passive heating). During active heating the vehicle management system 401 injects excess current into the motor to generate heat and this heat from the motor is transferred to the battery using the coolant network. For example, the motor have a heat transfer fluid (e.g., a coolant fluid) flowing though the motor to reduce the temperature of the motor. The vehicle management system 401 can send an energy storage heating command 318 to the heat transfer fluid control system that directs (e.g., via a valve) the heat transfer fluid to the energy storage. This method may be considered a low energy consumption method. When the energy storage temperature reaches or approaches the optimal temperature the vehicle management system 401 can send an energy storage heating command 318 to the heat transfer fluid control system that directs the heat transfer fluid away from the energy storage.

In some aspects, the vehicle management system 401 can increase the energy storage temperature by transferring heat from the motor to the energy storage via a heat pump (e.g., active thermal conditioning). For example, the vehicle management system 401 can send an energy storage heating command 318 to the heat pump control system that directs heat from the heat pump to the energy storage. When the energy storage temperature reaches or approaches the optimal temperature the vehicle management system 401 can send an energy storage heating command 318 to the heat pump control system to discontinue heat transfer from the heat pump to the energy storage.

In some aspects, the vehicle management system 401 can determine that the energy storage requires a decrease in temperature to bring it to the target temperature. For example, the vehicle management system 401 can control air flow to direct an air flow to the energy storage (e.g., guiding the outside air through ducts to the energy storage) thereby transferring heat (e.g., passive thermal conditioning) from the energy storage via convection.

In some aspects, the vehicle management system 401 can decrease the energy storage temperature by sending an energy storage cooling command 316 to a cooling control system to transfer heat from the energy storage to an ambient atmosphere (e.g., passive thermal conditioning) via a heat-transfer fluid (e.g., a coolant liquid). This cooling system can be a separate cooling system which only cools the energy storage, the motor can be cooled with a second liquid cooling system because of the operating temperature differences between the components.

In some aspects, the vehicle management system 401 can decrease the energy storage temperature by transferring the heat from the energy storage to the ambient atmosphere via a heat pump (e.g., active thermal conditioning) and/or heat conducting material (e.g., copper).

Any combination of the above methods for heating and/or cooling the battery can be used to precondition the energy storage to the optimal temperature range. The vehicle management system 401 can precondition the energy storage based on any parameter(s) including without limitation, the connector type of the destination charger, the EVSE type, a maximum power capability of the destination charger, an availability of the destination charger, an estimated travel time to the destination charger, a distance to the destination charger, and/or an ambient temperature at the destination charger.

In some aspects, the vehicle management system 401 can continue to condition the energy storage during the charging process to keep the temperature of the energy storage within an optimal range (e.g., approximately 20 to 30 degrees C.). For example, if the charging process at the destination charger increases the temperature of the energy storage, the vehicle management system 401 can reduce the energy storage temperature based on the methods (e.g., active/passive thermal conditioning) described above (e.g., liquid cooling). The energy storage can be conditioned during the charging process to the same temperature or a different temperature as the preconditioning process.

In some aspects, the target temperature for the energy storage preconditioning can be based on the age of the energy storage and/or the odometer reading associated with the EV. For example, if the energy storage has been used for years and/or the EV has travelled many miles, the target temperature can be different than the target temperature for a newer energy storage and EV with less miles. Additionally or alternatively, the target temperature for the energy storage preconditioning can be based on the number of fast charging instances associated with the energy storage. For example, if the energy storage has been fast charged many times, the target temperature can be different than the target temperature for an energy storage having less fast charging instances.

In some aspects, the target temperature for the energy storage preconditioning can be based on the energy of the energy storage of the EV at arrival at the destination charger. In other words, the target temperature can be set based on a determination of what the energy level of the energy storage of the EV will be when the EV arrives at the destination charger. The target temperature for the energy storage preconditioning can also be based on a recommended energy level of the energy storage of the EV at an end of the charging session at the destination charger. For example, the target temperature can be determined when the vehicle management system 401 recommends only charging the energy storage to a specific level less than fully charged. In this case, the recommended level can be set to be enough energy to enable the EV to proceed to another charging station for additional charging (e.g., cheaper charging, faster charging, etc.). The target temperature for the energy storage preconditioning can also be based on a power capability of the destination charger.

In some aspects, the vehicle management system 401 is configured to transmit a user notification 320 to a user display (e.g., user interface 405) of the navigation system. The user notification 320 may include an indicator of a status of the energy storage preconditioning. For example, the status indicator can display the current energy storage temperature, the target energy storage temperature, the distance/time to the destination charger, the maximum power of the destination charger, the SOE at the beginning of the charge, the charging time estimates, and/or the charging stop overlayed on a navigation map. In some aspects, the user notification 320 is a prompt to enable or disable the energy storage preconditioning. The preconditioning of the energy storage can be based on a response to the prompt. For example, a driver of the EV can enable or disable the energy storage preconditioning function.

Figure 4:
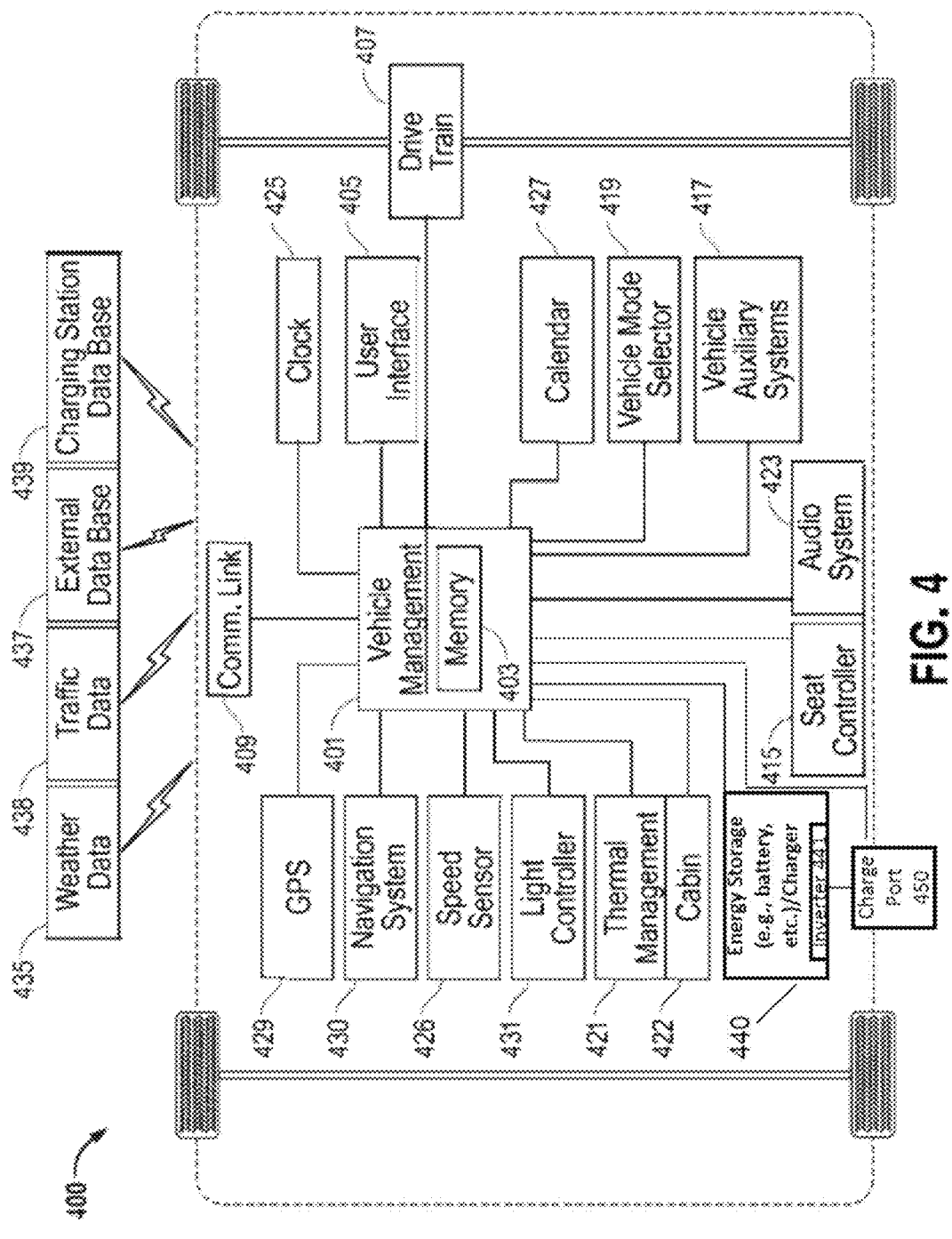
FIG. 4 is a high-level view of some embodiments of a vehicle 400.

FIG. 4 is a high-level view of some embodiments of a vehicle 400. Vehicle 400 can be an electric vehicle (EV), a vehicle utilizing an internal combustion engine (ICE), or a hybrid vehicle, where a hybrid vehicle utilizes multiple sources of propulsion including an electric drive system. Vehicle 400 includes a vehicle on-board vehicle management system 401, also referred to herein as a system controller, which is comprised of one or more processors (e.g., a central processing unit (CPU)). Vehicle management system 401 also includes memory 403, with memory 403 being comprised of EPROM, EEPROM, flash memory, RAM, solid state drive, hard disk drive, or any other type of memory or combination of memory types.

In some embodiments, vehicle 400 includes one or more internal networks by which vehicle management system 401 interfaces and communicates with one or more internal subsystems of vehicle 400. Vehicle management system 401 can also use the one or more internal networks to transfer communications to and from external locations. In some embodiments, the one or more internal networks can be communicably coupled to one or more networks through a network interface. The network interface can provide for wired and/or wireless communication. When used in a local area networking environment (or a wide area networking environment), the network interface can include an Ethernet interface and the one or more internal networks includes an Ethernet communication network (e.g., an Ethernet Ring, etc.) with an Ethernet Port. Other possible embodiments use other communication devices. For example, in some embodiments vehicle 400 includes a modem for communicating across an internal network and/or with an external network.

In some embodiments, vehicle 400 includes a charging port 450 and one or more batteries (e.g., battery pack, etc.)/battery charger as an energy storage 440 that provides power to portions of vehicle 400. The charging port 450 is used for providing voltage (e.g., from a destination charger 105) to vehicle 400 for charging the energy storage 440 (e.g., charging batteries by the use of, for example, an EVSE or other power source).

In some aspects, the vehicle management system 401 is configured to receive, from the navigation system 430, parameters associated with preconditioning the energy storage 440 for charging. The vehicle management system 401 is configured to precondition the energy storage 440 to a target temperature based on the parameters. For example, the vehicle management system 401 is configured to precondition the energy storage 440 while the vehicle 400 is travelling to a destination charger. The vehicle management system 401 is configured to charge the energy storage using charge port 450 to a target state of energy using the destination charger. In some embodiments, the inverter 441 converts AC voltage to DC voltage for charging a battery of the energy storage 440.

In some embodiments, vehicle 400 includes a user interface 405 is coupled to vehicle management system 401. User interface 405 allows the driver, or a passenger, to interact with the vehicle management system, for example inputting data into the navigation system 430, altering the heating, ventilation and air conditioning (HVAC) system via the thermal management system 421, controlling the vehicle's entertainment system (e.g., radio, CD/DVD player, etc.), adjusting vehicle settings (e.g., seat positions, light controls, etc.), and/or otherwise altering the functionality of vehicle 400. In some embodiments, user interface 405 also includes means for the vehicle management system to provide information to the driver and/or passenger, information such as a navigation map or driving instructions (e.g., via the navigation system 430 and GPS system 429) as well as the operating performance of any of a variety of vehicle systems (e.g., battery pack charge level for an EV, fuel level for an ICE-based or hybrid vehicle, selected gear, current entertainment system settings such as volume level and selected track information, external light settings, current vehicle speed (e.g., via speed sensor 426), current HVAC settings such as cabin temperature and/or fan settings, etc.) via the thermal management system 421. User interface 405 can also be used to warn the driver of a vehicle condition (e.g., low battery charge level or low fuel level) and/or communicate an operating system malfunction (battery system not charging properly, low oil pressure for an ICE-based vehicle, low tire air pressure, etc.). Vehicle 400 can also include other features like an internal clock 425 and a calendar 427.

In some aspects, the vehicle management system 401 is configured to display, on a display of the navigation system (e.g., user interface 405), an indicator of a status of the energy storage preconditioning. For example, the status indicator can display the energy storage temperature, the target energy storage temperature, the distance/time to the destination charger, the maximum power of the destination charger, the SOE at the beginning of the charge, the charging time estimates and/or the charging stop overlayed on a navigation map. In some aspects, the vehicle management system 401 is configured to display, on a display (e.g., user interface 405), a prompt to enable or disable the energy storage preconditioning, The preconditioning of the energy storage can be based on a response to the prompt. For example, a driver of the EV can enable or disable the energy storage preconditioning function.

In some embodiments, user interface 405 includes one or more interfaces including, for example, a front dashboard display (e.g., a cockpit display, etc.), a touch-screen display (e.g., a pilot panel, etc.), as well as a combination of various other user interfaces such as push-button switches, capacitive controls, capacitive switches, slide or toggle switches, gauges, display screens, warning lights, audible warning signals, etc. It should be appreciated that if user interface 405 includes a graphical display, vehicle management system 401 can also include a graphical processing unit (GPU), with the GPU being either separate from or contained on the same chip set as the processor.

Vehicle 400 also includes a drive train 407 that can include an internal combustion engine, one or more motors, or a combination of both. The vehicle's drive system can be mechanically coupled to the front axle/wheels, the rear axle/wheels, or both, and can utilize any of a variety of transmission types (e.g., single speed, multi-speed) and differential types (e.g., open, locked, limited slip).

Drivers often alter various vehicle settings, either when they first enter the car or while driving, in order to vary the car to match their physical characteristics, their driving style and/or their environmental preferences. Vehicle management system 401 monitors various vehicle functions that the driver can use to enhance the fit of the car to their own physical characteristics, such as seat position (e.g., seat position, seat height, seatback incline, lumbar support, seat cushion angle and seat cushion length) using seat controller 415 and steering wheel position using an auxiliary vehicle system controller 417. In some embodiments, vehicle management system 401 also can monitor a driving mode selector 419 which is used to control performance characteristics of the vehicle (e.g., economy, sport, normal). In some embodiments, vehicle management system 401 can also monitor suspension characteristics using auxiliary vehicle system controller 417, assuming that the suspension is user adjustable. In some embodiments, vehicle management system 401 also monitors those aspects of the vehicle which are often varied by the user in order to match his or her environmental preferences for the cabin 422, for example setting the thermostat temperature or the recirculation controls of the thermal management system 421 that uses an HVAC controller, and/or setting the radio station/ volume level of the audio system using controller 423, and/or setting the lights, either internal lighting or external lighting, using light controller 431. Also, besides using user-input and on-board sensors, vehicle management system 401 can also use data received from an external on-line source that is coupled to the controller via communication link 409 (using, for example, GSM, EDGE, UMTS, CDMA, DECT, WiFi, WiMax, etc.). For example, in some embodiments, vehicle management system 401 can receive weather information using an on-line weather service 435 or an on-line database 437, traffic data 438 for traffic conditions for the navigation system 430, charging station locations from a charging station database 439, etc. In some embodiments, communication link 409 comprises an Ethernet communication link with an Ethernet Port for external communications.

In some aspects, the vehicle management system 401 can receive parameters (e.g., from an external on-line database 437 stored in a cloud based server) associated with preconditioning the energy storage. For example, the vehicle management system 401 can receive a connector type of the destination charger, an electric vehicle supply equipment (EVSE) type, a maximum power of the destination charger, an availability of the destination charger, an estimated travel time to the destination charger, a distance to the destination charger, and/or an ambient temperature at the destination charger.

The vehicle management system 401 can transfer information with the components described above over one or more internal networks, such as those, for example, described above. In some embodiments, the vehicle management system 401 is communicably coupled to one or more of these components via an Ethernet communication network (e.g., an Ethernet Ring, etc.). The Ethernet communication network can be used to transfer other data such as data related to, but not limited to, one or more of a driver-assistance system, telematics, over-the-air updates, etc.

Figure 5:
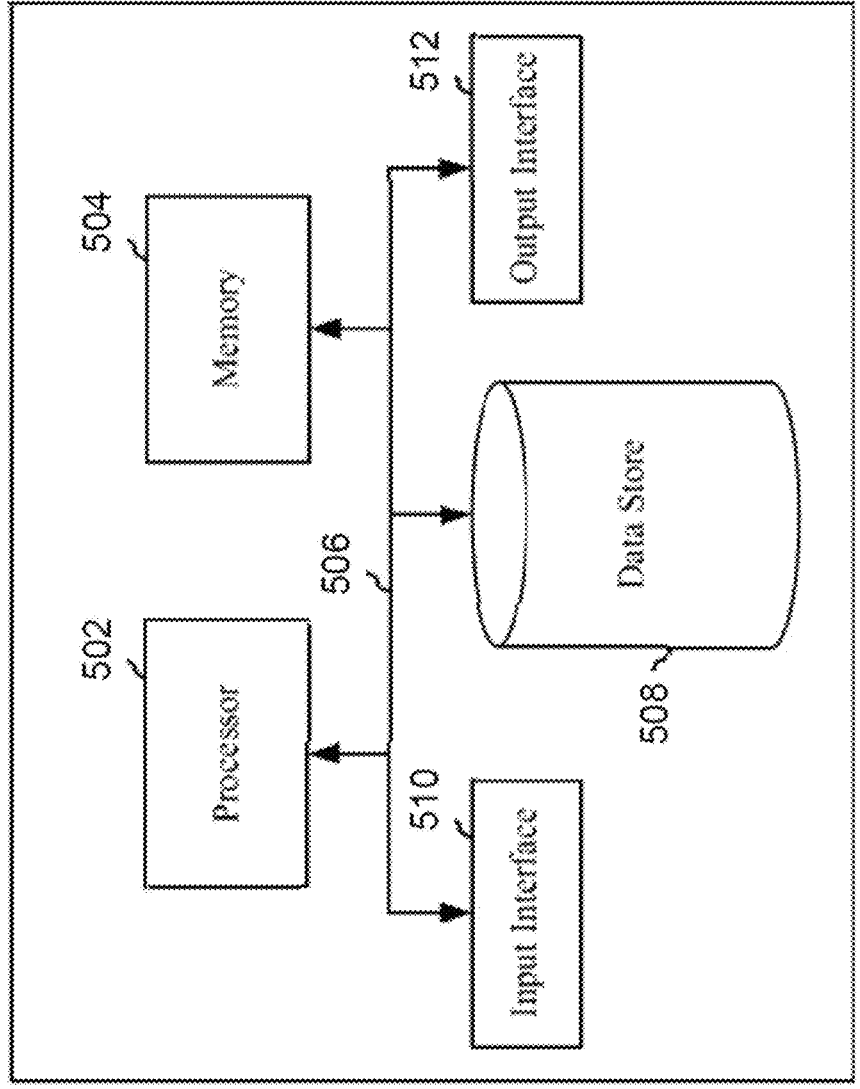
FIG. 5 is a high-level illustration of an exemplary computing device that can be used in accordance with the systems and methodologies disclosed herein.
Figure 5:

FIG. 5 is a high-level illustration of an exemplary computing device 500 that can be used in accordance with the systems and methodologies disclosed herein. For instance, the computing device 500 can be or include the vehicle 400 of FIG. 4. The computing device 500 includes at least one processor 502 that executes instructions that are stored in a memory 504. The instructions can be, for instance, instructions for implementing functionality described as being carried out by one or more modules or instructions for implementing one or more of the methods described above. The processor 502 can access the memory 504 by way of a system bus 506.

The computing device 500 additionally includes a data store 508 that is accessible by the processor 502 by way of the system bus 506. The data store 508 can include executable instructions and the like. The computing device 500 also includes an input interface 510 that allows external devices to communicate with the computing device 500. For instance, the input interface 510 can be used to receive instructions from an external computing device, from a user, etc. The computing device 500 also includes an output interface 512 that interfaces the computing device 500 with one or more external devices. In some embodiment, the input interface 510 and the output interface 512 can be used to communicate to a cloud server. These communications can relate to parameters for preconditioning an energy storage as described above. In some embodiments, the input interface 510 and the output interface 512 are part of, or communicably coupled to, an Ethernet port of an Ethernet communication network (e.g., an Ethernet Ring, etc.).

Additionally, while illustrated as a single system, it is to be understood that the computing device 500 can be a distributed system. Thus, for instance, several devices can be in communication by way of a network connection and can collectively perform tasks described as being performed by the computing device 500.

FIG. 6 is a flowchart 600 of a method for preconditioning an energy storage for fast charging. With reference to FIGS. 1-5, the method may be performed by vehicle management system 401 and navigation system 430. In some embodiments, the method may include receiving, from a navigation system, parameters associated with preconditioning the energy storage for charging. For example, referring to FIGS. 1-4, the method may include receiving 610, from a navigation system 430, parameters associated with preconditioning the energy storage 440 for fast charging.

In some embodiments, the method may include preconditioning 620, based on the parameters, the energy storage to a target temperature. For example, referring to FIGS. 2 and 3, the method may include preconditioning 620, based on the parameters including charger details 212 and destination details 214, the energy storage 440 to a target temperature.

In some embodiments, the method may include charging 630 the energy storage to a target state of energy using a destination charger. For example, referring to FIGS. 1-3, the method may include charging 630 the energy storage 440 to a target state of energy using a destination charging station 105.

All of the methods and tasks described herein can be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein can be embodied in such program instructions or can be implemented in application-specific circuitry (e.g., ASICs or FPGAs) of the computer system. Where the computer system includes multiple computing devices, these devices may, but need not, be co-located. The results of the disclosed methods and tasks can be persistently stored by transforming physical storage devices, such as solid-state memory chips or magnetic disks, into a different state. In some embodiments, the computer system can be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in some embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device can also include primarily analog components. For example, some or all of the rendering techniques described herein can be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The following examples are illustrative only and can be combined with other examples or teachings described herein, without limitation.

Example 1 is an electric vehicle (EV) comprising an energy storage; a navigation system; and a vehicle management system configured to receive, from the navigation system, parameters associated with preconditioning the energy storage for charging; precondition, while travelling to a destination charger and based on the parameters, the energy storage to a target temperature; and charge the energy storage to a target state of energy using the destination charger.

Example 2 can be combined with Example 1 and includes the vehicle management system is further configured to: precondition the energy storage by at least one of: increasing a temperature of the energy storage; or decreasing the temperature of the energy storage.

Example 3 can be combined with any of Examples 1-2 and further includes increasing the temperature of the energy storage comprises at least one of: increasing an amount of current provided to a motor of the EV; transferring heat from the motor to the energy storage via a heat-transfer fluid; or transferring the heat from the motor to the energy storage via a heat pump.

Example 4 can be combined with any of Examples 1-3 and further includes the decreasing the temperature of the energy storage comprises at least one of: directing an air flow across the energy storage; transferring heat from the energy storage to an ambient atmosphere via a heat-transfer fluid; or transferring the heat from the energy storage to the ambient atmosphere via a heat pump.

Example 5 can be combined with any of Examples 1~4 and further includes the target temperature comprises at least one of: a first temperature below a high temperature threshold; a second temperature above a low temperature threshold; or a third temperature in a middle range between the high temperature threshold and the low temperature threshold.

Example 6 can be combined with any of Examples 1-5 and further includes the vehicle management system is further configured to: precondition the energy storage based on an ambient temperature at the destination charger.

Example 7 can be combined with any of Examples 1-6 and further includes the vehicle management system is further configured to: precondition the energy storage based on a connector type of the destination charger, wherein the connector type indicates the destination charger provides AC charging or DC charging.

Example 8 can be combined with any of Examples 1-7 and further includes the vehicle management system is further configured to: precondition the energy storage based on a connector type of the destination charger, wherein the connector type indicates the destination charger provides AC charging or DC charging.

Example 9 can be combined with any of Examples 1-8 and further includes the vehicle management system is further configured to: precondition the energy storage based on a difference between the target state of energy and an estimated state of energy of the energy storage at the destination charger.

Example 10 can be combined with any of Examples 1-9 and further includes the vehicle management system is further configured to: precondition the energy storage based on at least one of: an estimated time of availability associated with the destination charger; an estimated travel time to the destination charger; or a distance to the destination charger.

Example 11 can be combined with any of Examples 1-10 and further includes the vehicle management system is further configured to: precondition, based on a current energy storage temperature, the energy storage to a second target temperature during a charging process at the destination charger.

Example 12 can be combined with any of Examples 1-11 and further includes the target temperature is based on at least one of: an age of the energy storage; an odometer reading associated with the EV; a first energy of the energy storage of the EV at arrival at the destination charger; a second recommended energy of the energy storage of the EV at an end of a charging session at the destination charger; a power capability of the destination charger; or a number of fast charging instances associated with the energy storage.

Example 13 can be combined with any of Examples 1-12 and further includes the navigation system is configured to receive the parameters from a cloud based server, the parameters including at least one of: connector type of the destination charger; an electric vehicle supply equipment (EVSE) type; a maximum power of the destination charger;

an availability of the destination charger; an estimated travel time to the destination charger; a distance to the destination charger; or an ambient temperature at the destination charger.

Example 14 can be combined with any of Examples 1-13 and further includes wherein the vehicle management system is further configured to: display, on a display of the navigation system, an indicator of a status of the energy storage preconditioning.

Example 15 can be combined with any of Examples 1-14 and further includes the vehicle management system is further configured to: display, on a display of the navigation system, a prompt to enable or disable the energy storage preconditioning, wherein the preconditioning of the energy storage is based on a response to the prompt.

Example 16 is method for controlling an electric vehicle (EV) having an energy storage, a navigation system, and a vehicle management system, the method comprising: receiving, from the navigation system, parameters associated with preconditioning the energy storage for charging; preconditioning, while travelling to a destination charger and based on the parameters, the energy storage to a target temperature; and charging the energy storage to a target state of energy using the destination charger.

Example 17 can be combined with Example 16 and includes the preconditioning the energy storage comprises at least one of: increasing a temperature of the energy storage; or decreasing the temperature of the energy storage.

Example 18 can be combined with any of Examples 16-17 and further includes increasing the temperature of the energy storage comprises at least one of: increasing an amount of current provided to a motor of the EV; transferring heat from the motor to the energy storage via a heat-transfer fluid; or transferring the heat from the motor to the energy storage via a heat pump.

Example 19 can be combined with any of Examples 16-18 and further includes the decreasing the temperature of the energy storage comprises at least one of: directing an air flow across the energy storage; transferring heat from the energy storage to an ambient atmosphere via a heat-transfer fluid; or transferring the heat from the energy storage to the ambient atmosphere via a heat pump.

Example 20 can be combined with any of Examples 16-19 and further includes the target temperature comprises at least one of: a first temperature below a high temperature threshold; a second temperature above a low temperature threshold; or a third temperature in a middle range between the high temperature threshold and the low temperature threshold.

Example 21 can be combined with any of Examples 16-20 and further includes preconditioning the energy storage based on an ambient temperature at the destination charger.

Example 22 can be combined with any of Examples 16-21 and further includes preconditioning the energy storage based on a connector type of the destination charger, wherein the connector type indicates the destination charger provides AC charging or DC charging.

Example 23 can be combined with any of Examples 16-22 and further includes preconditioning the energy storage based on a voltage level of the destination charger.

Example 24 can be combined with any of Examples 16-23 and further includes preconditioning the energy storage based on a difference between the target state of energy and an estimated state of energy of the energy storage at the destination charger.

Example 25 can be combined with any of Examples 16-24 and further includes preconditioning the energy storage based on at least one of: an estimated time of availability associated with the destination charger; an estimated travel time to the destination charger; or a distance to the destination charger.

Example 26 can be combined with any of Examples 16-25 and further preconditioning, based on a current energy storage temperature, the energy storage to a second target temperature during a charging process at the destination charger.

Example 27 can be combined with any of Examples 16-26 and further includes the target temperature is based on at least one of: an age of the energy storage; an odometer reading associated with the EV; a first energy of the energy storage of the EV at arrival at the destination charger; a second recommended energy of the energy storage of the EV at an end of a charging session at the destination charger; a power capability of the destination charger; or a number of fast charging instances associated with the energy storage.

Example 28 can be combined with any of Examples 16-27 and further includes receiving, by the navigation system from a cloud based server, the parameters including at least one of: connector type of the destination charger; an electric vehicle supply equipment (EVSE) type; a maximum power of the destination charger; an availability of the destination charger; an estimated travel time to the destination charger; a distance to the destination charger; or an ambient temperature at the destination charger.

Example 29 can be combined with any of Examples 16-28 and further includes displaying, on a display of the navigation system, an indicator of a status of the energy storage preconditioning.

Example 30 can be combined with any of Examples 16-29 and further includes displaying, on a display of the navigation system, a prompt to enable or disable the energy storage preconditioning, wherein the preconditioning of the energy storage is based on a response to the prompt.

Example 31 is an article of manufacture having one or more non-transitory computer readable media storing instructions which, when executed by an electronic device, cause the electronic device to perform a method comprising: receiving, from a navigation system, parameters associated with preconditioning an energy storage for charging; preconditioning, based on the parameters, the energy storage to a target temperature; and charging the energy storage to a target state of energy using a destination charger.

Example 32 is an apparatus including means for implementing a method as in any of Examples 1-31.

We claim:

1. An electric vehicle (EV) comprising:
an energy storage;
a navigation system; and
a vehicle management system configured to:
receive, from the navigation system, parameters associated with preconditioning the energy storage for charging;
determine a target temperature based on whether a destination charger provides DC or AC charging, the target temperature being different when the destination charger provides DC charging from when the destination charger provides AC charging;
precondition, while travelling to a destination charger and based on the parameters, the energy storage to the target temperature; and
charge the energy storage to a target state of energy using the destination charger.

2. The EV of claim 1, wherein the vehicle management system is further configured to: precondition the energy storage by at least one of:

increasing a temperature of the energy storage; or decreasing the temperature of the energy storage.

3. The EV of claim 2, wherein increasing the temperature of the energy storage comprises at least one of:

increasing an amount of current provided to a motor of the EV;

transferring heat from the motor to the energy storage via a heat-transfer fluid; or transferring the heat from the motor to the energy storage via a heat pump.

4. The EV of claim 2, wherein the decreasing the temperature of the energy storage comprises at least one of:

directing an air flow across the energy storage;

transferring heat from the energy storage to an ambient atmosphere via a heat-transfer fluid; or transferring the heat from the energy storage to the ambient atmosphere via a heat pump.

5. The EV of claim 1, wherein the target temperature comprises at least one of:

a first temperature below a high temperature threshold;

a second temperature above a low temperature threshold; or a third temperature in a middle range between the high temperature threshold and the low temperature threshold.

6. The EV of claim 1, wherein the vehicle management system is further configured to: precondition the energy storage based on an ambient temperature at the destination charger.

7. The EV of claim 1, wherein to determine whether the destination charger provides DC charging or AC charging is based on a connector type of the destination charger.

8. The EV of claim 1, wherein the vehicle management system is further configured to: precondition the energy storage based on a voltage level of the destination charger.

9. The EV of claim 1, wherein the vehicle management system is further configured to: precondition the energy storage based on a difference between the target state of energy and an estimated state of energy of the energy storage at the destination charger.

10. The EV of claim 1, wherein the vehicle management system is further configured to: precondition the energy storage based on at least one of:

an estimated time of availability associated with the destination charger;

an estimated travel time to the destination charger; or a distance to the destination charger.

11. The EV of claim 1, wherein the vehicle management system is further configured to:

precondition, based on a current energy storage temperature, the energy storage to a second target temperature during a charging process at the destination charger.

12. The EV of claim 1, wherein the target temperature is based on at least one of:

an age of the energy storage;

an odometer reading associated with the EV;

a first energy of the energy storage of the EV at arrival at the destination charger;

a second recommended energy of the energy storage of the EV at an end of a charging session at the destination charger;

a power capability of the destination charger; or a number of fast charging instances associated with the energy storage.

13. The EV of claim 1, wherein the navigation system is configured to receive the parameters from a cloud based server, the parameters including at least one of:

connector type of the destination charger;

an electric vehicle supply equipment (EVSE) type;

a maximum power of the destination charger;

an availability of the destination charger;

an estimated travel time to the destination charger;

a distance to the destination charger; or an ambient temperature at the destination charger.

14. The EV of claim 1, wherein the vehicle management system is further configured to:

display, on a display of the navigation system, an indicator of a status of the energy storage preconditioning.

15. The EV of claim 1, wherein the vehicle management system is further configured to:

display, on a display of the navigation system, a prompt to enable or disable the energy storage preconditioning, wherein the preconditioning of the energy storage is based on a response to the prompt.

16. A method for controlling an electric vehicle (EV) having an energy storage, a navigation system, and a vehicle management system, the method comprising:

receiving, from the navigation system, parameters associated with preconditioning the energy storage for charging;

preconditioning the energy storage to a target temperature while travelling to a destination charger, based on the parameters and based on a difference between the target state of energy and an estimated state of energy of the energy storage at the destination charger; and charging the energy storage to a target state of energy using the destination charger.

17. The method of claim 16, wherein the preconditioning the energy storage comprises at least one of:

increasing a temperature of the energy storage; or decreasing the temperature of the energy storage.

18. The method of claim 17, wherein increasing the temperature of the energy storage comprises at least one of:

increasing an amount of current provided to a motor of the EV;

transferring heat from the motor to the energy storage via a heat-transfer fluid; or transferring the heat from the motor to the energy storage via a heat pump.

19. The method of claim 17, wherein the decreasing the temperature of the energy storage comprises at least one of:

directing an air flow across the energy storage;

decreasing an amount of current provided to a motor of the EV;

transferring heat from the energy storage to an ambient atmosphere via a heat-transfer fluid; or transferring the heat from the energy storage to the ambient atmosphere via a heat pump.

20. The method of claim 16, wherein the target temperature comprises at least one of:

a first temperature below a high temperature threshold;

a second temperature above a low temperature threshold; or a third temperature in a middle range between the high temperature threshold and the low temperature threshold.

21. The method of claim 16, further comprising preconditioning the energy storage based on an ambient temperature at the destination charger.

22. The method of claim 16, further comprising preconditioning the energy storage based on a connector type of the destination charger, wherein the connector type indicates the destination charger provides AC charging or DC charging.

23. The method of claim 16, further comprising preconditioning the energy storage based on a voltage level of the destination charger.

24. The method of claim 16, further comprising preconditioning the energy storage based on at least one of:
an estimated time of availability associated with the destination charger;
an estimated travel time to the destination charger; or
a distance to the destination charger.

25. The method of claim 16, further comprising:
preconditioning, based on a current energy storage temperature, the energy storage to a second target temperature during a charging process at the destination charger.

26. The method of claim 16, wherein the target temperature is based on at least one of:
an age of the energy storage;
an odometer reading associated with the EV;
a first energy of the energy storage of the EV at arrival at the destination charger;
a second recommended energy of the energy storage of the EV at an end of a charging session at the destination charger;
a power capability of the destination charger; or
a number of fast charging instances associated with the energy storage.

27. The method of claim 16, further comprising:
receiving, by the navigation system from a cloud based server, the parameters including at least one of:

connector type of the destination charger;
an electric vehicle supply equipment (EVSE) type;
a maximum power of the destination charger;
an availability of the destination charger;
an estimated travel time to the destination charger;
a distance to the destination charger; or
an ambient temperature at the destination charger.

28. The method of claim 16, further comprising:
displaying, on a display of the navigation system, an indicator of a status of the energy storage preconditioning.

29. The method of claim 16, further comprising:
displaying, on a display of the navigation system, a prompt to enable or disable the energy storage preconditioning, wherein the preconditioning of the energy storage is based on a response to the prompt.

30. A non-transitory computer readable media storing instructions which, when executed by an electronic device of an electric vehicle, causes the electronic device to perform operations comprising:
receiving, from a navigation system, parameters associated with preconditioning an energy storage for charging;
preconditioning the energy storage to a target temperature, based on the parameters and based on a difference between the target state of energy and an estimated state of energy of the energy storage at the destination charger; and
charging the energy storage to a target state of energy using a destination charger.

* * * * *